United States Patent
Mennig et al.

(10) Patent No.: US 6,855,396 B1
(45) Date of Patent: Feb. 15, 2005

(54) SUBSTRATE COMPRISING AN ABRASION-RESISTANT DIFFUSION BARRIER LAYER SYSTEM

(75) Inventors: Martin Mennig, Quierschied (DE); Peter W. Oliveira, Saarbruecken (DE); Helmut Schmidt, Saarbruecken-Guedingen (DE)

(73) Assignee: Institut fuer Neue Materialien gemeinnuetzige GmbH, Saarbruecken (DE)

( * ) Notice: Subject to any disclaimer, the term of this patent is extended or adjusted under 35 U.S.C. 154(b) by 152 days.

(21) Appl. No.: 10/111,174

(22) PCT Filed: Oct. 27, 2000

(86) PCT No.: PCT/EP00/10589

§ 371 (c)(1),
(2), (4) Date: Apr. 18, 2002

(87) PCT Pub. No.: WO01/30922

PCT Pub. Date: May 3, 2001

(30) Foreign Application Priority Data

Oct. 28, 1999 (DE) .......................................... 199 52 040

(51) Int. Cl.$^7$ .......................... B32B 7/02; B32B 27/04; C08F 2/58; B05D 1/22; B05D 3/02

(52) U.S. Cl. .................. 428/144; 428/142; 428/212; 428/213; 428/323; 428/327; 427/386; 427/385.5; 427/387; 427/314; 427/316; 427/553; 427/557

(58) Field of Search .................. 428/212, 300.7, 428/96, 142, 323, 327; 204/471, 484, 500; 427/386, 385.5, 387, 314, 316, 553, 557

(56) References Cited

U.S. PATENT DOCUMENTS

| | | | |
|---|---|---|---|
| 4,895,767 A | 1/1990 | Mori et al. | |
| 5,470,910 A | 11/1995 | Spanhel et al. | |
| 5,644,014 A | 7/1997 | Schmidt et al. | |
| 5,731,091 A | * 3/1998 | Schmidt et al. | 428/428 |
| 6,008,285 A | 12/1999 | Kasemann et al. | |
| 6,020,419 A | * 2/2000 | Bock et al. | 524/590 |
| 6,162,498 A | * 12/2000 | Mennig et al. | 427/226 |
| 6,228,921 B1 | 5/2001 | Kasemann et al. | |
| 6,236,493 B1 | * 5/2001 | Schmidt et al. | 359/296 |
| 6,346,331 B2 | * 2/2002 | Harvey et al. | 428/429 |
| 6,455,103 B1 | 9/2002 | Mennig et al. | |
| 6,500,534 B1 | 12/2002 | Dittfurth et al. | |
| 6,537,672 B1 | * 3/2003 | Dittfurth et al. | 428/413 |
| 6,639,039 B1 | * 10/2003 | Fries et al. | 528/32 |

FOREIGN PATENT DOCUMENTS

| | | |
|---|---|---|
| DE | 4118184 | 12/1992 |
| DE | 4338361 | 5/1995 |
| DE | 19746885 | 6/1999 |
| DE | 19823732 | 12/1999 |
| DE | 19857316 | 6/2000 |
| DE | 19857317 | 6/2000 |
| EP | 0195493 | 9/1986 |
| WO | 93/07179 | 4/1993 |
| WO | 95/13249 | 5/1995 |
| WO | 98/45502 | 10/1998 |

OTHER PUBLICATIONS

Ullmanns Encycloädie der Technischen Chemie, vol. 15, 4th ed., 1978, pp. 589–592.

* cited by examiner

*Primary Examiner*—Rena Dye
*Assistant Examiner*—Lawrence Ferguson
(74) *Attorney, Agent, or Firm*—Greenblum & Bernstein, P.L.C.

(57) ABSTRACT

A substrate has an abrasion-resistant diffusion barrier layer system having: a hard base layer including a coating composition based on a polymer containing reactive surface groups; and a nanostructured topcoat obtained by applying a nanoscale composition comprising sol particles and/or particulate solids to the basecoat and then curing it. The system features good abrasion resistance and diffusion barrier effect, and is particularly suitable as a protective coat for plastic substrates.

32 Claims, No Drawings

SUBSTRATE COMPRISING AN ABRASION-RESISTANT DIFFUSION BARRIER LAYER SYSTEM

The present invention relates to a substrate provided with an abrasion-resistant diffusion barrier coat system, the coating system comprising a hard basecoat and at least one nanostructured, i.e. nanophase-containing, topcoat, and to a process for producing the substrate provided with an abrasion-resistant diffusion barrier coat system.

The coating of the substrates with coats having particular physical properties, such as high refractive index, high abrasion resistance, protection against the inward diffusion of substances, e.g. gases from the atmosphere or water, for example, is a great problem particularly in the case of substrates unable to withstand thermal loads, since without thermal densification to give purely inorganic coats, a hermetic seal is extremely difficult to achieve. Even with coats applied by sputtering, the frequency of pinholes and other defects is such that there can be no talk of a hermetic seal. In many cases, however, coats of this kind are adequate; although hermetic sealing is not achieved, the surface obtained is sufficiently sound.

Additionally, coatings obtained by wet-chemical means, in which coating takes place from a solvent phase, lead to structures which are generally very open (polymers having high free volumes), and in systems containing particles there are likely to be interstices through which gas diffusion and material transport may take place. Consequently, it is not possible with these systems either to obtain an effective seal without densification at high temperatures.

Even inorganic/organic composite systems are unable to provide adequate sealing without additional inorganic sputtering coats. The abrasion resistance of such coats, although much greater than that of typical plastics, such as PC and PMMA, is nevertheless inadequate for many purposes (for example, glazing systems).

Thin coats of less than 1 $\mu$m can generally be produced by gas phase deposition processes but also by sol-gel processes. With gas phase deposition processes it is possible to produce even purely inorganic coats. Purely inorganic coats, if they can be produced without pores, seal off the substrate hermetically even in very thin coats; substances such as gases or water are unable to enter by diffusion. This factor is connected with the density of the network, which does not possess the free volumes that are the case with organic polymers. Furthermore, they lack sufficient flexibility to allow passage of gas molecules.

Following the deposition process, inorganic sol-gel materials have a relatively low theoretical density—in other words, there is no close packing, since a high packing density is prevented by the interaction of the sol particles and/or sol molecules. Interaction comes about through dipolar interactions and/or hydrogen bonds or chemical bonds, and prevents relaxation taking place at low temperatures. The typical packing densities of such coats are situated at between 5 and 25% of the theoretical density.

Whereas subsequent densification is possible by using high temperatures when such coats are applied to ceramic and vitreous materials, it is not possible in the case of application to polymer substrates. Typical densification temperatures of inorganic systems are situated at between 450 and 1000° C., and such processes are therefore unsuitable for polymers. Additionally, although it is possible to obtain relatively thin coats on polymer substrates with the above-mentioned systems, the resulting coats are of extremely low mechanical stability and low scratch resistance. It is a problem in particular for transparent coats which are used in optics, since in such applications the requirement is often for very thin coats.

The object of the invention was therefore to provide an abrasion-resistant diffusion barrier coat system comprising a system of thin coats with high mechanical strength and an increased diffusion barrier effect. The intention in particular was to achieve this without the need for a heat treatment at high temperatures (for example, densification of the coats at from 450° C. to 1000° C.), so that the coating system is suitable even for substrates which cannot be exposed to such high temperatures. A further intention was that transparent coats should also be possible, so that coated substrates having the aforementioned properties can be obtained that are suitable for optical applications. The coated substrates, moreover, ought to be obtainable by way of a wet-chemical process.

The object of the invention has surprisingly been achieved by a substrate having an abrasion-resistant diffusion barrier coat system which comprises
- a hard basecoat comprising a coating composition based on compounds which are polymerizable or curable thermally or photochemically to form a polymer, and
- a nanostructured topcoat obtainable by applying a composition comprising nanoscale sol particles and/or particulate solids to the basecoat, still containing reactive surface groups, and then carrying out heat treatment or curing.

The hard basecoat comprises a coating composition based on compounds which are polymerizable or curable thermally or photochemically to form a polymer. The curable or polymerizable compounds comprise inorganic compounds, organically modified inorganic compounds, or purely organic compounds or monomers, it being also possible, of course, to use mixtures thereof. Preference is given to using organically modified inorganic compounds or mixtures of organically modified inorganic compounds and inorganic compounds, in the latter case the amount of organically modified inorganic compounds being preferably at least 40 mol %, with particular preference at least 60 mol %. Overall, preferably at least 20 mol %, with particular preference at least 40 mol %, of all of the polymerizable or curable compounds used are organic compounds and/or organically modified inorganic compounds.

The term polymerization as used here is intended to embrace all customary polymerization reactions, such as free-radical addition polymerization, polycondensation or polyaddition. This embraces in particular the (poly)condensation of the hydrolysable compounds that takes place in the context of the sol-gel process elucidated later on below. The resulting condensates, accordingly, are likewise polymers. By curing (crosslinking) is meant in particular the process of linking to form a three-dimensional network. This embraces the condensation of hydrolysable compounds to form a three-dimensional network. In the coating composition, the compounds may be present as monomers or else may comprise oligomers or (pre)polymers which have already undergone at least partial polymerization or crosslinking. In the coating compositions which include inorganic compounds or organically modified inorganic compounds, these compounds may then be present, for example, in already partly hydrolyzed and/or condensed form.

The coating composition based on the compounds which are polymerizable or curable thermally or photochemically to form a polymer is preferably a coating composition based on compounds of glass-forming and/or ceramic-forming elements. These compounds are, in particular, hydrolysable and condensable compounds. The coating composition is obtained from these compounds preferably from the sol-gel process. Examples of glass-forming and/or ceramic-forming elements are the elements of groups 3 to 6 and 12 to 15 of the Periodic Table, or the lanthamide elements.

These elements preferably comprise Si, Al, B. Pb, Sn, Ti, Zr, V and Zn, especially Si, Al, Ti and Zr, or mixtures thereof. It is also possible to use compounds of other elements, especially those of elements of groups 1 of 2 of the Periodic Table (e.g. Na, K, Ca and Mg) or of groups 7 to 10 of the Periodic Table (e.g. Mn, Fe, Co and Ni). Preferably, however, compounds of the elements just mentioned account for not more than 20 mol %, and in particular not more than 10 mol %, of the overall amount of hydrolysable monomeric compounds used.

With particular preference, the coating composition is a coating composition obtained by the sol-gel process and based on organically modified inorganic compounds, particularly silane compounds. Hydrolysable silane compounds are used in particular, preferably at least some of the hydrolysable silane compounds having at least one non-hydrolysable substituent. By way of example, a preferred coating composition comprises a polycondensate which is obtainable by the sol-gel process and is based on (A) one or more silanes of the general formula (I)

$$R_a SiX_{(4-a)} \tag{I}$$

in which the radicals R are identical or different and are non-hydrolysable groups, the radicals X are identical or different and are hydrolysable groups or hydroxyl groups and a is 0, 1, 2 or 3, a being greater than 0 for at least 40 mol % of the silanes, or an oligomer derived therefrom, and (B) if desired, one or more compounds of glass-forming or ceramic-forming elements.

In the general formula (I), the hydrolysable groups X, which may be identical to or different from one another, are, for example, hydrogen or halogen (F, Cl, Br or I), alkoxy (preferably $C_{1-6}$ alkoxy, such as methoxy, ethoxy, n-propoxy, isopropoxy and butoxy), aryloxy (preferably $C_{6-10}$ aryloxy, such as phenoxy), acyloxy (preferably $C_{1-6}$ acyloxy, such as acetoxy or propionyloxy), alkylcarbonyl (preferably $C_{2-7}$ alkylcarbonyl, such as acetyl), amino, monoalkylamino or dialkylamino having preferably from 1 to 12, in particular from 1 to 6, carbon atoms.

Non-hydrolysable radicals R which may be identical to or different from one another may be non-hydrolysable radicals R having a functional group or without a functional group.

The non-hydrolysing radical R is, for example, alkyl (preferably $C_{1-8}$ alkyl such as methyl, ethyl n-propyl isopropyl, n-butyl, s-butyl and t-butyl, pentyl, hexyl, octyl or cyclohexyl), alkenyl (preferably $C_{2-6}$ alkenyl, such as vinyl, 1-propenyl, 2-propenyl and butenyl), alkynyl (preferably $C_{2-6}$ alkynyl such as acetylenyl and propargyl) and aryl (preferably $C_{6-10}$ aryl, such as phenyl and naphthyl). The radicals R and X may if desired have one or more customary substituents, such as halogen or alkoxy.

Specific examples of the functional groups of the radical R are the epoxy, hydroxylether, amino, monoalkylamino, dialkylamino, amide, carboxyl, vinyl, acryloyloxy, methacryloyloxy, cyano, halogen, aldehyde, alkylcarbonyl and phosphoric acid group. These functional groups are attached to the silicon atom via alkylene, alkenylene or arylene bridging groups, which may be interrupted by oxygen groups or —NH— groups. These bridging groups are derived, for example, from the above-mentioned alkyl, alkenyl or aryl radicals. The radicals R having a functional group contain preferably from 1 to 18 carbon atoms, in particular from 1 to 8 carbon atoms. Of course, the radical R may also have more than one functional group.

In one preferred embodiment, use is made of hydrolysable silanes having a functional group, in particular having the abovementioned functional groups, preferably epoxy groups, such as a glycidyl group or glycidyloxy group, or (meth)acryloyloxy groups. They comprise, in particular, silanes of the general formula (I) in which X is preferably $C_{1-4}$ alkoxy and with particular preference is methoxy and ethoxy, and R is a glycidyloxy-$(C_{-6})$-alkylene radical or a (meth)acryloyloxy-$(C_{1-6})$-alkylene radical, in which $(C_{1-6})$-alkylene is, for example, methylene, ethylene, propylene or butylene. Specific examples of hydrolysable silanes which can be used in accordance with the invention may be found, for example, in EP-A-195493. Owing to their ready availability, the use of γ-glycidyloxypropyltrimethoxysilane, γ-glycidyloxypropyltriethoxysilane, 3-(meth)acryloyloxypropyltriethoxysilane and 3-(meth)acryloyloxypropyl-trimethoxysilane is particularly preferred in accordance with the invention. (Meth)acryl- stands for methacryl- or acryl-.

Where use is made of abovementioned silanes having a non-hydrolysable substituent with an epoxy group, it is preferred to use a curing catalyst which is selected from Lewis bases and alkoxides of titanium, zirconium or aluminium. This curing catalyst acts in particular as a catalyst for epoxide-epoxide and/or polyol-epoxide crosslinking. The curing catalyst is added to the corresponding compositions generally in an amount of from 0.01 to 0.6 mol per mole of epoxide group in the hydrolysable silanes. Preferred amounts are in the range from 0.02 to 0.4 mol and in particular from 0.05 to 0.3 mol of curing catalyst per mole of epoxide group.

The Lewis base is preferably a nitrogen compound. Nitrogen compounds of this kind may be selected, for example, from N heterocycles, phenols containing amino groups, polycyclic amines and ammonia (preferably in the form of an aqueous solution). Specific examples include 1-methylimidazole, 2-(N,N-dimethylaminomethyl)phenol, 2,4,6-tris (N,N-dimethylaminomethyl)phenol and 1,8-diazabicyclo[5.4.0]-7-undecene. Of these compounds, particular preference is given to 1-methylimidazole. Another class of nitrogen-containing Lewis bases which may be used in accordance with the invention are hydrolysable silanes possessing at least one non-hydrolysable radical which includes at least one primary, secondary or tertiary amino group.

The alkoxides of Ti, Zr or Al preferably comprise one such of the general formula (II)

$$M(OR''')_m \tag{II}$$

in which M is Ti, Zr or Al, R''' is an alkyl group having preferably from 1 to 4 carbon atoms (methyl, ethyl, n-propyl, isopropyl, n-butyl, sec-butyl or tert-butyl) or an alkyleneoxyalkyl group having preferably from 1 to 4 carbon atoms for both the alkylene unit and the alkyl unit (e.g. methylene, ethylene, 1,2-propylene, 1,3-propylene and 1,4-butylene for the alkylene unit and the examples given above for the alkyl group for the alkyl unit) and m is 4 (M=Ti, Zr) or 3 (M=Al). Preferred curing catalysts are $Al(OCH_2CH_2OC_4H_9)$, (aluminium tributoxyethoxide), in which the butyl group is preferably an n-butyl group, aluminium sec-butoxide, and mixtures of aluminium tributoxyethoxide and aluminium sec-butoxide. For further details, refer to DE-A-4338361.

Where abovementioned silanes having a non-hydrolysable substituent having a functional group are used, it is also possible to use other hydrolysable compounds of glass-forming or ceramic-forming elements together with the hydrolysable silane having a functional group, the amount of the other hydrolysable compounds preferably not exceeding 80 mol %, and in particular 60 mol %, based on the total amount of hydrolysable compounds used. With preference at least 10 mol %, and with particular preference at least 20 mol %, of all of the hydrolysable compounds used are the other hydrolysable compounds which are different from the hydrolysable silane(s) having at least one functional group on a non-hydrolysable substituent.

Particularly in the case of coating compositions based on hydrolysable silane compounds having an epoxide group, it is possible to use, as a further component, an organic monomer, oligomer or polymer having at least one epoxide group, or mixtures thereof. These organic monomers, oligomers or polymers having epoxide groups are, for example, compounds known per se which are used in the prior art as epoxy resins, as casting resins and as epoxy reactive diluents.

In the case of the further hydrolysable compounds of glass-forming or ceramic-forming elements, it is possible to use compounds of all of the glass-forming or ceramic-forming elements set out above. As examples of the hydrolysable groups of these compounds, reference may be made to the examples of X set out in formula (I). Preferred examples are the compounds of the formula (II) and the compounds H set out in DE-A-4338361. Besides the hydrolysable groups, the compounds may also contain non-hydrolysable groups. Except for Si, however, this is not preferred. As examples, reference may likewise be made to the examples of R set out in formula (I). With preference not more than 70 mol %, in particular not more than 50 mol %, of all the hydrolysable compounds are compounds of glass-forming or ceramic-forming elements that are not Si.

As hydrolysable compounds it is also possible to use, additionally or alone, for example, one or more hydrolysable silicon compounds having at least one non-hydrolysable radical containing from 5 to 30 fluorine atoms attached to carbon atoms which may be separated from Si by at least two atoms. As hydrolysable groups in this case it is possible, for example, to use those as specified for X in formula (I). Silanes of this kind are described in detail in DE 41 18 184. These fluorinated silanes are used, where desired, generally in an amount of from 0.1 to 15% by weight, preferably from 0.2 to 10% by weight, and with particular preference from 0.5 to 5% by weight, based on the weight of all hydrolysable compounds.

Besides the inorganic compounds or organically modified inorganic compounds, the coating composition may also be based on purely organic compounds (monomers). If desired, some or all of the compound which is polymerizable or curable thermally or photochemically to form a polymer may be replaced by a corresponding polymer. This polymer based on organic compounds preferably still has reactive groups via which further polymerization or curing may take place. Where the coating composition is based only on these polymers based on organic compounds, it is necessary that the reactive groups are present. The organic monomers and polymers which can be used are, for example, the customary monomers and coating systems known from the prior art, such as are described, for example, in Ullmanns Encyklopädie der technischen Chemie, Vol. 15, 4th ed., 1978, p. 589 ff.

Specific examples of polymerizable monomers which result in a purely organic polymer matrix are (meth)acrylic acid, (meth)acrylic esters, (meth)acrylonitrile, styrene and styrene derivatives, alkenes (e.g. ethylene, propylene, butene, isobutene), halogenated alkenes (e.g. tetrafluoroethylene, chlorotrifluoroethylene, vinyl chloride, vinyl fluoride, vinylidene fluoride, vinylidene chloride), vinyl acetate, vinylpyrrolidone, vinylcarbazole, and mixtures of such monomers. Polyunsaturated monomers may also be used, examples including butadiene and ethylene dimethacrylate.

Suitable corresponding polymers include any desired known plastics, for example polyacrylic acid, polymethacrylic acid, polyacrylates, polymethacrylates, polyolefins, polystyrene, polyamides, polyimides, polyvinyl compounds, such as polyvinyl chloride, polyvinyl alcohol, polyvinyl butyral, polyvinyl acetate and corresponding copolymers, e.g. poly(ethylene-vinyl acetate), polyesters, e.g. polyethylene terephthalate or polydiallyl phthalate, polyarylates, polycarbonates, polyethers, e.g. polyoxymethylene, polyethylene oxide or polyphenylene oxide, polyether ketones, polysulphones, polyepoxides and fluoropolymers, e.g. polytetrafluoroethylene. It is preferred to use transparent polymers or corresponding monomers.

In one preferred embodiment, crosslinkable coating systems based on organic monomers or corresponding polymers are used. These systems may be based on the abovementioned polymers. Here again, the systems in question are the customary systems known from the prior art, which are set out, for example, in the abovementioned Ullmann reference. Specific examples are acrylic resins, alkyd resins, polyester resins (crosslinking by way of amino resins, for example), polyurethane resins and epoxy resins, and the corresponding monomer systems.

Additionally, additives known in the field of coatings technology may be added to the coating composition based on the compounds which are polymerizable or curable thermally or photochemically to form a polymer. Examples of such additives include solvents, crosslinking agents, lubricants, nanoscale particulate solids, polymerization initiators, photosensitizers or levelling agents. Examples of lubricants are surfactants, fluorosilanes or graphite. For the nanoscale particulate solids that can be used, reference may be made to the description below.

Since the application of the coating composition to this substrate is normally carried out wet-chemically, the coating composition preferably includes a solvent. This solvent comprises the customary solvents which are used in the coatings field. Examples of suitable solvents, particularly for compounds which form an organically modified inorganic matrix, are alcohols, preferably lower aliphatic alcohols ($C_1$–$C_8$ alcohols), such as methanol, ethanol, 1-propanol, isopropanol and 1-butanol, ketones, preferably lower dialkyl ketones, such as acetone and methyl isobutyl ketone, ethers, preferably lower dialkyl ethers, such as diethyl ether, or monoethers of diols, such as ethylene glycol or propylene glycol with $C_1$–$C_8$ alcohols, amides, such as dimethylformamide, and mixtures thereof. Examples of high-boiling solvents are triethylene glycol, diethylene glycol diethyl ether and tetraethylene glycol dimethyl ether. For further solvents, particularly for compounds which form an organic matrix, reference may again be made to the abovementioned Ullmann reference.

The coating composition may comprise crosslinking agents. The crosslinking agents contain at least two reactive groups which are able to react with the functional groups present in the coating composition. The nature of the crosslinking agents is of course guided by the functional groups that are present in the coating composition. The selection of appropriate crosslinking agents is commonplace for the person skilled in the art. In the case of coating compositions containing epoxide, for example, use may be made of crosslinking agents containing organic or inorganic groups having reactive hydrogen, e.g. amine, isocyanate or hydroxyl groups.

Polymerization initiators which can be used are photoinitiators and thermal polymerization catalysts, which are selected as a function of the composition used and are known to the person skilled in the art. Examples are radical photoinitiators, radical thermoinitiators, cationic photoinitiators, cationic thermoinitiators, and any desired combinations thereof.

Specific examples of radical photoinitiators that can be used are Irgacure® 184 (1-hydroxycyclohexyl phenyl ketone), Irgacure® 500 (1-hydroxycyclohexyl phenyl ketone, benzophenone) and other photoinitiators of the Irgacure® type obtainable from Ciba-Geigy; Darocur® 1173, 1116, 1398, 1174 and 1020 (available from Merck); benzophenone, 2-chlorothioxanthone, 2-methylthioxanthone, 2 isopropylthioxanthone, benzoin, 4,4'-dimethoxybenzoin, benzoin ethyl ether, benzoin isopropyl ether, benzil dimethyl ketal, 1,1,1-trichloroacetophenone, diethoxyacetophenone and dibenzosuberone. Examples of radical thermoinitiators include organic peroxides in the form of diacyl peroxides, peroxydicarbonates, alkyl peresters, alkyl peroxides, perketals, ketone peroxides and alkyl hydroperoxides, and also azo compounds. Specific examples which could be mentioned here include in particular dibenzoyl peroxide, tert-butyl perbenzoate and azobisisobutyronitrile. An example of a cationic photoinitiator is Cyracure® UVI-6974, while a preferred cationic thermoinitiator is 1-methylimidazole.

Photochemical curing may take place in accordance with customary techniques, for example by means of WV radiation. In addition it is also possible to carry out further customary curing techniques, such as electron beam curing and laser curing.

These polymerization initiators are used in the customary amounts known to the person skilled in the art (e.g. 0.01-5% by weight, in particular 0.1-2% by weight, based on the overall solids content of the coating composition). It is of course also possible to operate without a polymerization initiator if this initiator is unnecessary.

In one preferred embodiment, the coating composition is obtained from hydrolysable compounds by the sol-gel process. In this process the hydrolysable compounds are hydrolysed with water, where appropriate by heating or by means of acid or base catalysis, and are partly condensed. Either stoichiometric amounts of water or else larger or smaller amounts may be used. The sol which forms may readily be adjusted to the viscosity that is desired for the coating composition, this being done by the person skilled in the art using appropriate parameters, such as degree of condensation, solvent or pH. The coating composition is preferably used in the form of a sol for the coating. Further details of the sol-gel process may be found, for example, in W. Noll, Chemie und Technologie der Silicone, 2nd ed., Verlag Chemie, 1968.

Coating compositions which can be used with preference can be found, for example, in EP-A-0 607 213 or in DE-A-4338361, which is hereby incorporated in its entirety by reference.

The nanostructured topcoat comprises nanophases, in the form for example of nanoscale sol particles and/or particulate solids. The particles in question are, in particular, nanoscale inorganic sol particles and/or particulate solids, with or without surface modification.

The nanoscale sol particles and/or particulate solids comprise particles having an average size (an average particle diameter) of not more than 1000 nm, preferably not more than 200 nm, more preferably not more than 100 nm, and in particular not more than 70 nm. A particularly preferred particle size range is situated from 1 to 100 nm, in particular from 5 to 50 nm The nanoscale (inorganic) sol particles and/or particulate solids may consist of any desired materials, but preferably consist of metals and, in particular, of metal compounds such as, for example, (anhydrous or hydrated) oxides such as ZnO, CdO, $SiO_2$, $TiO_2$, $ZrO_2$, $CeO_2$, $SnO_2$, $Al_2O_3$, $In_2O_3$, $La_2O_3$, $Fe_2O_3$, $Cu_2O$, $Ta_2O_5$, $Nb_2O_5$, $V_2O_5$, $MoO_3$ or $WO_3$; chalkogenides such as, for example, sulphides (e.g. CdS, ZnS, PbS and $Ag_2S$), selenides (e.g. GaSe, CdSe and ZnSe) and tellurides (e.g. ZnTe or CdTe), halides such as AgCl, AgBr, AgI, CuCl, CuBr, $CdI_2$ and $PbI_2$; carbides such as $CdC_2$ or SiC; arsenides such as AlAs, GaAs and GeAs; antimonides such as InSb; nitrides such as BN, AlN, $Si_3N_4$ and $Ti_3N_4$; phosphides such as GaP, InP, $Zn_3P_2$ and $Cd_3P_2$; phosphates, silicates, zirconates, aluminates, stannates, and the corresponding mixed oxides (for example indium-tin oxides (ITO) and those with perovskite structure such as $BaTiO_3$ and $PbTiO_3$).

The nanoscale inorganic sol particles and/or particulate solids used are preferably those of oxides, sulphides, selenides and tellurides of metals and mixtures thereof. Particular preference is given in accordance with the invention to nanoscale particles of $Si_2$, $TiO_2$, $ZrO_2$, ZnO, $Ta_2O_2$, $SnO_2$ and $Al_2O_3$ (in all modifications, particularly as boehmite, AlO(OH)), and mixtures thereof.

The nanoscale particulate solids used in accordance with the invention may be prepared in a conventional manner, for example by flame pyrolysis, plasma processes, gas phase condensation processes, colloid techniques, precipitation processes, sol-gel processes, controlled nucleation and growth processes, MOCVD processes and (micro)emulsion processes. These processes are described at length in the literature. In particular, use may be made, for example, of metals (for example, after reduction, including precipitation processes), ceramic oxide systems (by precipitation from solution), or else saltlike systems or multicomponent systems. The saltlike or multicomponent systems also include semiconductor systems.

The nanoscale sol particles and/or particulate solids may be used as they are or in surface-modified form. Preference is generally given to using nanoscale sol particles and/or particulate solids which have been provided with addition-polymerizable/polycondensable groups; in the case of nanoscale sol particles and/or particulate solids comprising $SiO_2$, in particular, however, it is also possible to achieve very good results without surface modification. For this purpose it is possible, for example, to use commercial silica products, examples being silica sols, such as the Levasils® from Bayer AG, or pyrogenic silicas, such as the Aerosil products from Degussa. The particles which are not surface modified may also, however, be prepared in situ.

The nanoscale inorganic particles that may be used in accordance with the invention and are provided with addition-polymerizable and/or polycondensable organic surface groups may be prepared in principle by two different methods: firstly, by surface modification of pre-prepared nanoscale inorganic particles, and secondly by preparation of these inorganic nanoscale particles using one or more compounds which possess addition-polymerizable and/or polycondensable groups of this kind. These two methods are described in greater detail later on below.

The organic addition-polymerizable and/or polycondensable surface groups may be any desired groups which are known to the person skilled in the art and which are able to undergo radical, cationic or anionic, thermal or photochemical addition polymerization or thermal or photochemical polycondensation (where appropriate in the presence of a suitable initiator and/or catalyst). Preference is given in accordance with the invention to surface groups which possess a (meth)acryloyl, allyl, vinyl or epoxy group, particular preference being given to (meth)acryloyl and epoxy groups. In the case of the polycondensable groups, mention could be made in particular of hydroxyl, carboxyl and amino groups, by means of which ether, ester and amide bonds can be obtained.

It is also preferred in accordance with the invention for the organic groups present on the surfaces of the nanoscale particles and containing the addition-polymerizable and/or polycondensable groups to have a relatively low molecular weight. In particular, the molecular weight of the (purely organic) groups should not exceed 500 and preferably 300, with particular preference 200. Of course, this does not rule out the compounds (molecules) containing these groups having a much higher molecular weight, of course (for example, 1000 or more).

As already mentioned above, the addition-polymerizable/polycondensable surface groups may in principle be provided by two methods. Where surface modification of pre-prepared nanoscale particles is carried out, compounds suitable for this purpose are all (preferably low molecular weight) compounds which on the one hand possess one or more groups which are able to react or at least interact with (functional) groups (such as OH groups in the case of oxides, for example) present on the surface of the nanoscale particulate solids, and secondly have at least one addition-polymerizable/polycondensable group. Accordingly, the corresponding compounds may, for example, form both covalent and ionic (saltlike) or coordinative (complex) bonds to the surface of the nanoscale particulate solids, while pure interactions that may be mentioned include, by way of example, dipol—dipol interactions, hydrogen bonding, and van der Waals interactions. Preference is given to the formation of covalent and/or coordinative bonds. Specific examples of organic compounds which can be used for surface modification of the nanoscale inorganic particulate solids include, for example, unsaturated carboxylic acids such as acrylic acid and methacrylic acid, β-dicarbonyl compounds (e.g. β-diketones or β-carbonylcarboxylic acids) having polymerizable double bonds, ethylenically unsaturated alcohols and amines, epoxides and the like. Particularly preferred such compounds in accordance with the invention are—especially in the case of oxide particles—hydrolytically condensable silanes having at least (and preferably) one non-hydrolysable radical which possesses a polymerizable carbon-carbon double bond or an epoxide ring. Silanes of this kind preferably have the general formula (III):

in which Y is $CH_2$=$CR^3$—COO, $CH_2$=CH or glycidyloxy, $R^3$ is hydrogen or methyl, $R^1$ is a divalent hydrocarbon radical having from 1 to 10, preferably from 1 to 6, carbon atoms, containing if desired one or more heteroatom groups (e.g. O, S, NH) which separates adjacent carbon atoms from one another, and the radicals $R^2$, identical to or different from one another, are the groups specified for X in the general formula (I) and are selected in particular from alkoxy, aryloxy, acyloxy and alkylcarbonyl groups and also halogen atoms, (especially F, Cl and/or Br).

The groups $R^2$ are preferably identical and are selected from halogen atoms, $C_{1-4}$ alkoxy groups (e.g. methoxy, ethoxy, n-propoxy, isopropoxy and butoxy), $C_{6-10}$ aryloxy groups (e.g. phenoxy), $C_{1-4}$ acyloxy groups (e.g. acetoxy and propionyloxy) and $C_{2-10}$ alkylcarbonyl groups (e.g. acetyl. Particularly preferred radicals $R^2$ are $C_{1-4}$ alkoxy groups and especially methoxy and ethoxy.

The radical $R^1$ is preferably an alkylene group, especially one having from 1 to 6 carbon atoms, such as ethylene, propylene, butylene and hexylene. If Y is $CH_2$=CH, $R^1$ is preferably methylene and in this case may also be a simple bond.

Y is preferably $CH_2$=$CR^3$—COO (with $R^3$ preferably being $CH_3$) or glycidyloxy. Accordingly, particularly preferred silanes of the general formula (I) are (meth)acryloyloxyalkyltrialkoxysilanes such as 3-methacryloyloxypropyltri(m)ethoxysilane and glycidyloxyalkyltrialkoxysilanes such as 3-glycidyloxypropyltri(m)ethoxysilane.

If the nanoscale inorganic particles have actually been prepared using one or more compounds which possess addition-polymerizable/polycondensable groups, there is no need for subsequent surface modification (although this is of course possible as an additional measure).

The in situ preparation of nanoscale inorganic sol particles and/or particulate solids having addition-polymerizable/polycondensable surface groups will be elucidated below taking $SiO_2$ particles as an example. For this purpose, the $SiO_2$ particles may be prepared, for example, by the sol-gel process using at least one hydrolytically polycondensable silane having at least one addition-polymerizable/polycondensable group. Examples of suitable silanes of this kind are the above-described silanes of the general formula (I) without non-hydrolysable substituents. In this case it is also possible to use silanes which possess a (non-hydrolysable) hydrocarbon group without any functional group, such as methyl- or phenyl-trialkoxysilanes. Especially when an easy-to-clean surface of the coat is desired, it may be advisable to use a certain amount (for example, up to 60 mol % and in particular up to 50 mol %, on the basis of all silanes used) of abovementioned silanes having fluorine-containing (non-hydrolysable) radicals.

An (additional) constituent of the composition comprising nanoscale sol particles and/or particulate solids may also, for example, be at least one monomeric or oligomeric species which possesses at least one group which is able to react (by addition polymerization or polycondensation) with the addition-polymerizable/polycondensable groups that are present on the surface of the nanoscale particles. Examples of such species that may be mentioned include monomers having a polymerizable double bond, such as acrylates, methacrylates, styrene, vinyl acetate and vinyl chloride, for example. For further details of the nanoscale particulate solids, the monomeric or oligomeric species, and additives which can be used additionally, refer to DE-A-19746885, the content of which is hereby incorporated in its entirety by reference. For the composition comprising nanoscale particulate solids as well it is possible in particular to use the additives set out above for the coating composition. The specific examples set out there for the additives may also be used for the topcoat.

The composition comprising nanoscale particles is applied preferably by wet-chemical means to the basecoat. The composition is therefore preferably in the form of a sol or in the form of a composition (suspension) which is still flowable. The liquid constituent of this composition is composed, for example, of water and/or (preferably watermiscible) organic solvents and/or compounds which were used or produced in the preparation of the nanoscale particles or their surface modification (for example, alcohols in the case of alkoxysilanes). Suitable organic solvents which may be used in addition are, for example, alcohols, ethers, ketones, esters, amides and the like. For these, reference may be made to the solvents specified above. Besides the solvent, the composition comprising nanoscale particles in one preferred embodiment further comprises no further additives apart from polymerization initiators whose use may be intended and which has likewise already been set out above.

The substrate to be coated may comprise, for example, a substrate made of metal, including non-ferrous metal, glass, ceramic, glass ceramic, plastic, wood or paper. The substrate may be in any desired form, for example as a plate, foil, disc or irregular form. Since a particular advantage of the present invention is that abrasion-resistant diffusion barrier coats can be obtained without a need to use high temperatures, the invention is of course particularly suitable for thermally sensitive substrates. These include substrates of plastic in particular. Examples of plastics substrates are polyethylene, polypropylene, polyacrylate, such as polymethyl methacrylate and polymethyl acrylate, polyvinyl butyral, polycarbonate, polyurethanes, ABS copolymers or polyvinyl chloride. Since the coating systems of the invention can also easily be prepared in transparent form, preference is given to transparent substrates, especially plastic. The coating system may also of course be used for substrates which are not thermally sensitive.

The substrate may be pretreated conventionally, for example, to achieve cleaning, degreasing, corrosion protection, smoothing, or better adhesion to the coating. The substrate may be provided, for example, with an undercoat or may be pretreated with a customary primer, such as silanes or aminosilanes, or pretreated by means of $Ar/O_2$ plasma or corona discharge, or appropriate irradiation techniques.

Both the coating composition for the basecoat and the composition for the topcoat(s) are applied to the substrate preferably by wet-chemical means, particularly in the form of a sol. They can be applied in any customary manner, for example by squirting, spraying, flowcoating, brushing, electrocoating, dipping, spincoating or flooding. The basecoat preferably has a dry film thickness in the range of 1–50 $\mu$m, preferably 3–30 $\mu$m, and in particular 5–10 $\mu$m. The topcoat, or each topcoat, preferably has a dry film thickness in the range of 100–1000 nm, preferably 150–500 nm, and in particular 200–300 nm.

The coating composition for the basecoat is selected so that a hard basecoat is formed. The hardness of coatings can be determined in various ways, by scratch testing, for example. Standardized methods are indicated, for example, in the abovementioned Ullmann reference. A hard basecoat is understood here to be preferably a basecoat which has at least the same hardness and preferably a greater hardness than the substrate to be coated.

Following application, the coating composition for the basecoat is exposed to conditions in which, although drying and/or complete or partial polymerization or curing can take place, the operation is nevertheless such that the basecoat still contains reactive surface groups.

In the case of a partial polymerization and/or curing of the basecoat, the coating composition, after flashing off, for instance, may be treated thermally or photolytically, for example, in order to achieve incipient drying and/or incipient curing. The conditions, such as temperature, amount of radiation or duration of the treatment, however, should be chosen such that the basecoat still contains reactive groups. This can be achieved by, for example, drying the applied basecoat at a temperature which lies within a range from room temperature up to not more than 100° C., preferably not more than 85° C., in particular not more than 70° C.

In the case of complete polymerization and/or curing of the basecoat, the basecoat is aftertreated in order to generate reactive surface groups, by means of flame, plasma, corona, oxidation or reduction treatment or primer coating, for example.

The reactive groups are groups by means of which fisher polymerization or curing is possible. Regarding these reactive groups, reference is made to the functional groups specified in respect of the materials for the coatings. These reactive groups also include, in particular, the hydrolysable groups (e.g. M-Oalkyl, M-glass-forming or ceramic-forming elements such as Si) that are still present in the coating compositions based on the inorganic compounds or organically modified compounds, and the hydroxyl groups (e.g. M—OH, M-glass-forming or ceramic-forming elements such as Si) which result following hydrolysis and have not yet been condensed to form, for example, siloxane groups. By way of these groups, then, it is possible for further condensation to take place. Examples of reactive groups present with preference are hydroxyl groups, hydrolysable groups on glass-forming or ceramic-forming elements (e.g. M-Oalkyl, M—OH), epoxide groups and (meth)acryloyloxy groups. As a result of the reactive groups, there is also sufficient reactivity present for achieving sufficient adhesion of the topcoat.

A top the basecoat that still contains reactive surface groups, then, the nanostructured topcoat is applied and is subsequently cured or heat-treated. Curing may take place, for example, thermally or photochemically. For the possible curing methods, reference is made to the methods described in connection with the basecoat. It is assumed that there are also crosslinking reactions between the nanoscale particles by way of any addition-polymerizable/polycondensable surface groups that are present. Particularly when using nanoscale particles without addition-polymerizable/polycondensable surface groups, a heat treatment is carried out. Without being bound to any one theory, it is assumed that linking reactions (for example, by way of remaining silanol groups) or densification reactions take place. In the case of heat treatment it is of course also possible for curing reactions to take place.

The thermal curing or heat treatment takes place, for example, at temperatures of not more than 200° C., preferably from 60 to 160° C., with particular preference from 120 to 130° C. Possible temperature ranges, therefore, are well below the temperatures which are normally considered necessary for densification or sintering (usually at least 450° C.). Despite this, extremely abrasion-resistant diffusion barrier coats are obtained. This is all the more surprising on account of the fact that direct application of compositions comprising nanoscale particles to a substrate does not afford the possibility of producing suitable coatings. It is supposed that a role is also played by interactions between the remaining reactive groups of the coating composition and the reactive groups in the composition used for the topcoat, by these groups leading, for example, to adhesion-promoting bonds between the coats.

It has been found that the permeation rate of gases is significantly reduced. The abrasion values found after 1000 cycles with a Taber Abraser, measured as the diffuse light loss in %, are in some cases not more than 1%. Compared with this, glass gives diffuse light losses of 1.5%, transparent plastics 30-60%, and customary hard coats 3-20%.

The abrasion-resistant diffusion barrier coat system of the invention on the substrate is suitable as a protective coat for any desired substrates. Fields of use include coatings for machines, floors, components, instruments, rotors, articles of everyday use, operating elements, glass, materials of transparent plastic, glazing, displays, drinking vessels, non-ferrous metals, furniture, jewellery, and also in vehicle construction and in interior fitting.

EXAMPLES

Example 1

Preparation of an $SiO_2$ Sol for the Topcoat 98.87 g of tetraethoxysilane (TEOS) were mixed with 63.83 g of ethanol to give a solution A. Additionally, 63.83 g of ethanol, 72.50 g of deionized water and 1.38 g of HCl (37%) were mixed to give a solution B. Mixing of solutions A and B with warming at 30-40° C. produced a sol which was stirred at room temperature for 1.5 h and then stored at −20° C.

Immediately prior to application, the sol was diluted with ethanol to a solids content of 3% by weight.

Example 2

Preparation of a Surface-Modified $SiO_2$ Sol for the Topcoat

To prepare an alcoholic 5.1% strength $SiO_2$ sol, 247 g of tetraethoxysilane (TEOS) were hydrolysed and condensed with 76 g of ethanol in HCl-acidic solution (76 g of ethanol+76 g of double-distilled $H_2O$+5.8 g of HCl, 37% in water). Glycidyloxypropyltrimethoxysilane (GPTS) was added in an $SiO_2$:GPTS weight ratio of 4:1 and the sol was stirred at 50° C. for 5 h. As an alternative to glycidyloxypropyltrimethoxysilane, it is possible to use methacryloyloxypropyltrimethoxysilane (MPTS) in a corresponding weight ratio.

Example 3

Preparation of an $SiO_2$ Sol for the Topcoat

To prepare a 3% by weight $SiO_2$ sol, 1.95 g of silica sol (Levasil 200S/30 from Bayer), 43.35 g of ethanol and 3.00 g of tetraethoxysilane (REOS) were mixed and stirred at room temperature for 18 h.

Example 4

Preparation of a $CeO_2/SiO_2$ Sol for the Topcoat

To prepare a 10% by weight $CeO_2/SiO_2$ sol, 25 g of ethanol, 10.0 g of a 20% by weight cerium oxide suspension and 5.0 g of tetraethoxysilane (TEOS) were mixed and stirred at room temperature for 24 h.

Example 5

Preparation of a $TiO_2$ Sol for the Topcoat

For preparing a nanoparticulate $TiO_2$ sol, 2.1 g of tetraisopropyl orthotitanate were added to a mixture of isopropanol, 0.981 g of concentrated HCl (37% by weight in water) and 0.105 g of $H_2O$ and the mixture was stirred at 25° C. for 24 h. Then 2 g of MPTS were added to 200 g of $TiO_2$ sol and the mixture was stirred under reflux at 50° C. for 5 h. A fraction of the isopropanol (10 g) was distilled off under reduced pressure and 14 g of 2-isopropoxyethanol and the photoinitiator, UVI® 6974 (Union Carbide), were added. As an alternative to MPTS, it is possible to use the same amount of GPTS.

Example 6

Preparation of the Coating System
Application of the Primer Solution

PC plates (Makrolon 3103) measuring 10×10 cm² were used as the substrate. The primer solution (2% by weight of γ-aminopropyltriethoxysilane in isopropanol) was applied by spincoating (conditions: application volume: 3 ml; spinning speed: 1500 rpm; acceleration: 05; duration: 10 s). Curing was carried out at 130° C. (30 minutes) in a forced air drying oven.
Application of the Hard Basecoat Following the application of the primer, a hard coating system based on hydrolysable epoxysilanes was applied again by spincoating (conditions: application volume: 4 ml; spinning speed: 600 rpm; acceleration: 05; duration: 10 s). This was followed by incipient curing of this basecoat at 80° C. (5 minutes) in a forced air drying oven.
Application of the Topcoat After the basecoat had been applied, a coating sol for the topcoat was applied, again by means of spincoating (conditions: application volume: 3 ml; spinning speed: 1500 rpm; acceleration: 05; duration: 10 s) This was followed by curing. Curing was carried out at 130° C. (2 h) in a forced air drying oven.
Characterization of the Coats Coat systems are obtained whose adhesion according to cross-cut/tape test (DIN 53151 and DIN 58196-K2 respectively) is very good (GT/TT=0/0). The diffuse light loss after 1000 cycles of the Taber Abtaser test PIN 52347/CS-10F abrading wheels/load: 2×500 g/height of suction tube: 3 mm) is between 1 and 3%. (These values relate to different samples prepared by different individuals on different days in order to provide statistical reliability.) The film thickness (dry) of the applied hard coat is about 5 μm. The film thickness (dry) of the topcoats, measured using a profilometer, is from approximately 200 to 300 nm.

The diffusion rates were measured using a Permatran-W 3/31 from Mocon at 25° C. and 100% relative atmospheric humidity. The diffusion rates of water vapour are in some cases up to 20% below the diffusion rates of the uncoated films.

We claim:

1. A substrate having an abrasion-resistant diffusion barrier coat system, wherein the coat system comprises:
    (a) a hard basecoat comprising a coating composition based on compounds which have been polymerized or cured thermally or photochemically to form a polymer;
    (b) a nanostructured topcoat obtainable by applying a composition comprising at least one of nanoscale sol particles and particulate solids to the basecoat while the basecoat comprises reactive surface groups, and then carrying out at least one of a heat treatment and a curing operation.

2. The substrate of claim 1, wherein the basecoat has a dry film thickness of from 1 μm to 50 μm.

3. The substrate of claim 1, wherein the coat system further comprises one or more additional nanostructured topcoats.

4. The substrate of claim 1, wherein the topcoat has a dry film thickness of from 100 nm to 1000 nm.

5. The substrate of claim 3, wherein each topcoat has a dry film thickness of from 100 nm to 1000 nm.

6. The substrate of claim 1, wherein the topcoat has been prepared from at least one of nanoscale sol particles and particulate solids having at least one of polymerizable and polycondensable surface groups.

7. The substrate of claim 1, wherein the at least one of nanoscale sol particles and particulate solids have an average particle size of not more than 200 nm.

8. The substrate of claim 2, wherein the at least one of nanoscale sol particles and particulate solids have an average particle size of from 1 nm to 70 nm.

9. The substrate of claim 4, wherein the at least one of nanoscale sol particles and particulate solids have an average particle size of from 5 nm to 50 nm.

10. The substrate of claim 1, wherein the at least one of nanoscale sol particles and particulate solids comprise metal compounds.

11. The substrate of claim 10, wherein the metal compounds comprise at least one of oxides, sulfides, selenides and tellurides.

12. The substrate of claim 11, wherein the metal compounds comprise at least one of $SiO_2$, $TiO_2$, $ZrO_2$, ZnO, $Ta_2O_5$, $SnO_2$ and $Al_2O_3$.

13. The substrate of claim 1, wherein the coating composition of the basecoat comprises a polycondensate obtained by a sol-gel process and derived from at least one silane which comprises an epoxide group on a non-hydrolyzable substituent.

14. The substrate of claim 13, wherein the coating composition of the basecoat further comprises a curing catalyst selected from at least one of Lewis bases and alkoxides of titanium, zirconium and aluminum.

15. The substrate of claim 1, wherein the substrate comprises a plastic material.

16. The substrate of claim 15, wherein the substrate comprises at least one of polyethylene, polypropylene, polyacrylate, polyvinyl butyral, polycarbonate, polyurethane, acrylonitrile-butadiene-styrene terpolymer and polyvinyl chloride.

17. A substrate having an abrasion-resistant diffusion barrier coat system, wherein the coat system comprises:
(a) a hard basecoat comprising a coating composition based on compounds which have been polymerized or cured thermally or photochemically to form a polymer;
(b) a nanostructured topcoat obtained by applying a composition comprising at least one of nanoscale sol particles and particulate solids to the basecoat while the basecoat still comprises reactive surface groups, and then carrying out at least one of a heat treatment and a curing operation;
the coating composition of the basecoat comprising a polycondensate obtained by a sol-gel process and derived from:
(A) one or more silanes of formula $R_aSiX_{(4-a)}$ where each R independently represents a non-hydrolyzable group; each X independently represents a hydroxy group or a hydrolyzable group; and a is 0, 1, 2 or 3 and is greater than 0 for at least 40 mol % of the one or more silanes; or an oligomer derived therefrom;
(B) optionally, one or more compounds of at least one of glass-forming elements and ceramic-forming elements.

18. The substrate of claim 17, wherein the basecoat has a dry film thickness of from 1 µm to 50 µm; the topcoat has a dry film thickness of from 100 nm to 1000 nm, and said at least one of nanoscale sol particles and particulate solids have an average particle size of from 5 nm to 50 nm and comprise at least one of a metal oxide, sulfide, selenide and telluride.

19. A process for producing a substrate provided with an abrasion-resistant diffusion barrier coat system, comprising:
(a) applying to the substrate a coating composition based on compounds which are thermally or photochemically polymerizable or curable to form a polymer;
(b) at least one of curing and polymerizing the composition to form a coating which comprises reactive surface groups,
(c) applying a composition comprising at least one of nanoscale sol particles and particulate solids to the coating of (b);
(d) at least one of curing and heat-treating the composition of (c) to form a topcoat.

20. The process of claim 19, wherein in (b) the at least one of curing and polymerizing of the composition is carried out under conditions which result in a coating which comprises reactive surface groups.

21. The process of claim 19, wherein in (b) the at least one of curing and polymerizing of the composition is followed by a post-treatment to create reactive surface groups on the coating.

22. The process of claim 20, wherein in (b) the at least one of curing and polymerizing of the composition is followed by a post-treatment to create further reactive surface groups on the coating.

23. The process of claim 19, wherein prior to (a), the substrate is treated with a primer.

24. The process of claim 19, wherein the coating of (b) is dried at a temperature of not higher than 100° C. before applying the composition of (c).

25. The process of claim 19, wherein (d) comprises photochemically curing the composition of (c).

26. The process of claim 19, wherein (d) comprises thermally curing the composition of (c).

27. The process of claim 24, wherein the substrate comprises a plastic substrate.

28. The process of claim 27, wherein the at least one of nanoscale sol particles and particulate solids have an average particle size of not more than 200 nm.

29. The process of claim 19, wherein the at least one of nanoscale sol particles and particulate solids have an average particle size of from 1 nm to 70 nm.

30. The process of claim 28, wherein the at least one of nanoscale sol particles and particulate solids comprise metal compounds.

31. The process of claim 30, wherein the metal compounds comprise at least one oxides, sulfides, selenides and tellurides.

32. The process of claim 19, wherein the at least one of nanoscale sol particles particulate solids comprise at least one of $SiO_2$, $TiO_2$, $ZrO_2$, ZnO, $Ta_2O_5$, $SnO_2$ and $Al_2O_3$.

* * * * *